United States Patent [19]
Bursott et al.

[11] 3,904,222
[45] Sept. 9, 1975

[54] OCCUPANT RESTRAINT SYSTEM

[75] Inventors: Leslie W. Bursott, Utica; Robert M. Caldwell, Rochester; Donald K. Cameron, Fraser, all of Mich.

[73] Assignee: General Motors Corporation, Detroit, Mich.

[22] Filed: Dec. 3, 1973

[21] Appl. No.: 420,798

[52] U.S. Cl. ............ 280/150 AB; 180/90; 222/55.3; 222/556
[51] Int. Cl.² ........................................ B60R 21/08
[58] Field of Search .............. 280/150 AB; 180/90; 220/55.3; 222/556

[56] References Cited
UNITED STATES PATENTS

| 3,628,809 | 12/1971 | Cirillo | 280/150 AB |
| 3,632,136 | 1/1972 | Foltz | 280/150 AB |
| 3,640,546 | 2/1972 | Brawn | 280/150 AB |
| 3,708,179 | 1/1973 | Hulten | 280/150 AB |
| 3,791,671 | 2/1974 | Zens | 280/150 AB |
| 3,794,346 | 2/1974 | Brockman | 280/150 AB |
| 3,794,349 | 2/1974 | Fuller | 280/150 AB |
| 3,801,126 | 4/1974 | Knight et al. | 280/150 AB |

*Primary Examiner*—David Schonberg
*Assistant Examiner*—John P. Silverstrim
*Attorney, Agent, or Firm*—Herbert Furman

[57] ABSTRACT

An instrument panel structure mounts an occupant restraint cushion housing having a flanged elongated opening. An inflatable occupant restraint cushion is housed within the housing and communicates with an inflator mounted to the housing. A cover assembly for the housing is secured to the instrument panel structure and includes an integrally hinged closure closing an opening therein generally coextensive with that of the housing. The cover assembly includes flanges defining the free side and upper edge portions of the opening therein. The free edge portions of the closure are provided with inwardly offset flanges underlying the flanges of the assembly to releasably hold the closure in closed position against outward movement. In one embodiment, integral ribs of the side and upper flanges of the closure engage the side and upper flanges of the housing to block movement of the side and upper flanges of the closure inwardly of the housing. In a second embodiment, a spacer on the upper flange of the housing blocks inward movement of the upper flange of the closure. In a third embodiment, the integral rib on one side flange of the closure engages a respective side flange of the housing and spacers on the cover assembly and housing block inward movement of the outer side flange and upper flange of the closure.

4 Claims, 9 Drawing Figures

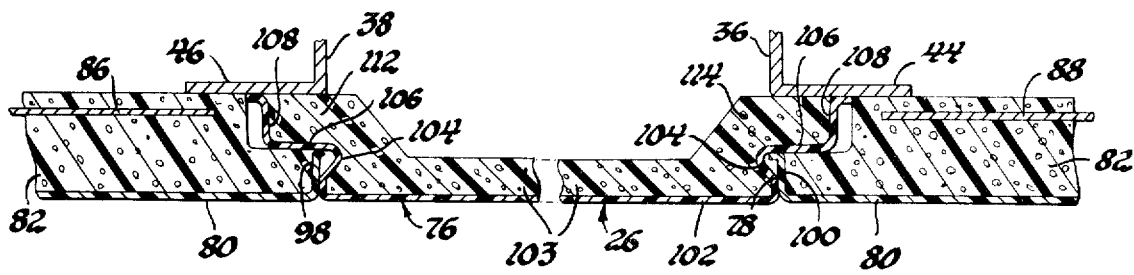
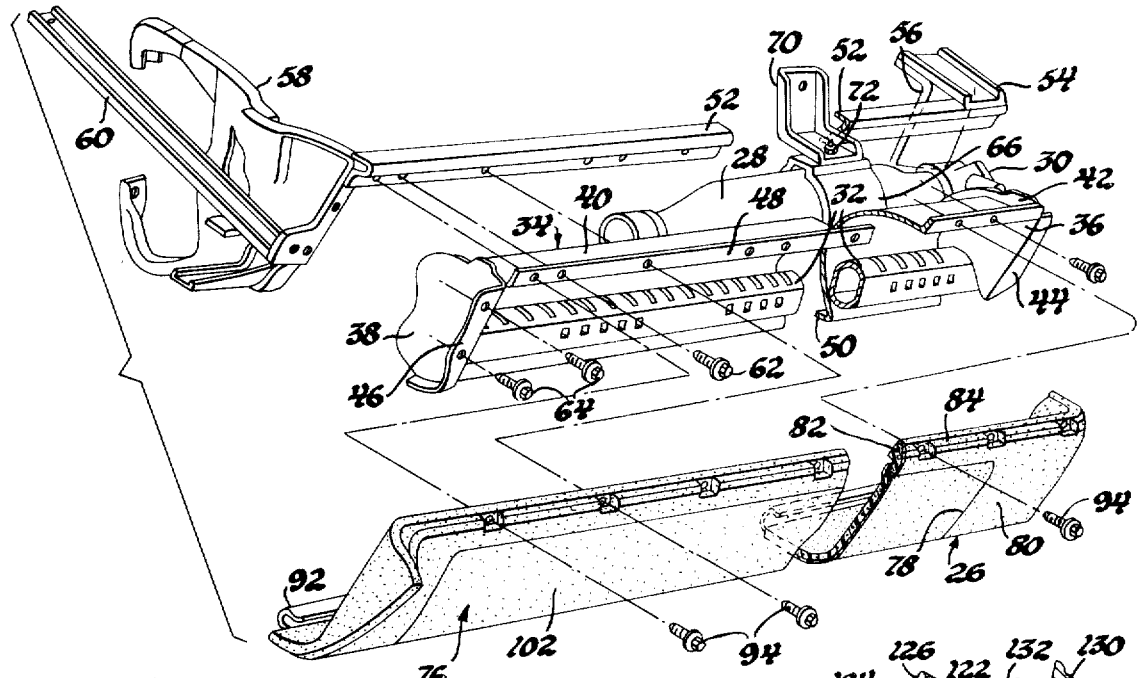
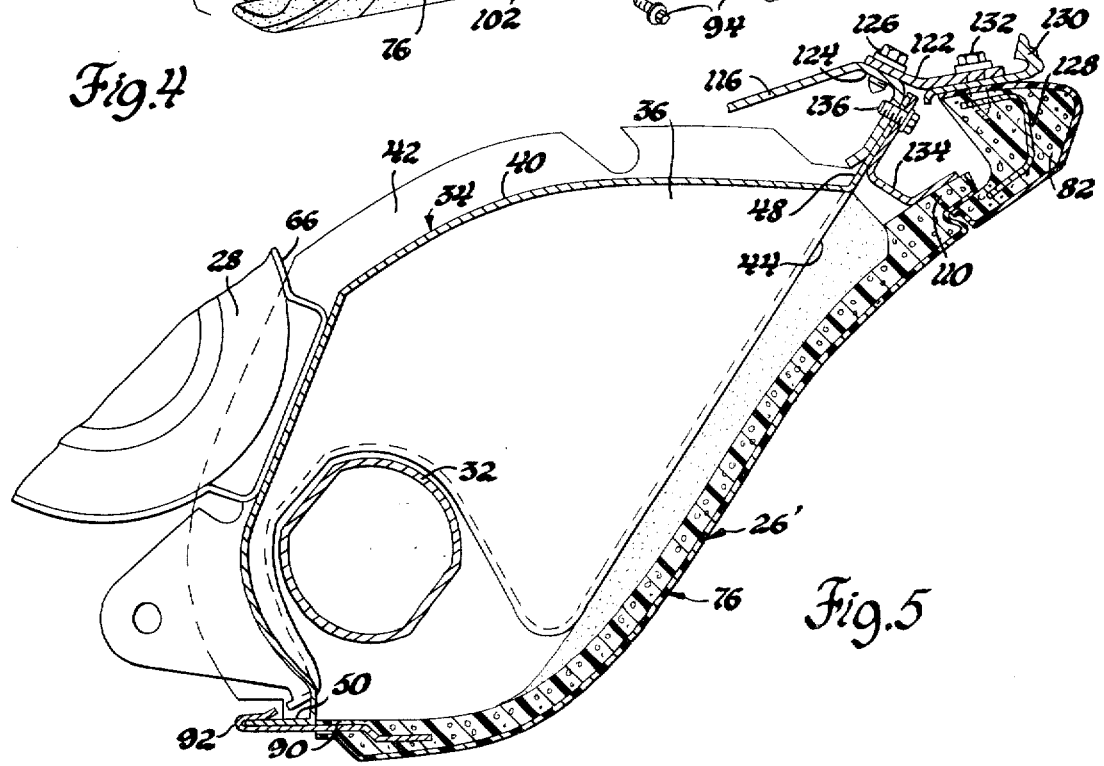

OCCUPANT RESTRAINT SYSTEM

This invention relates generally to occupant restraint systems and more particularly to a cover assembly for such systems which includes a closure normally closing an opening in the cover assembly and movable to an open position with respect to such opening to permit deployment of the cushion therethrough.

Cover assemblies of this general type are known as shown in Ser. No. 255,028 Fuller, filed May 19, 1972, and assigned to the assignee of this invention.

The cover assembly of this invention differs in that the free edge portions of the closure underlie respective free edge portions of the cover assembly which define the opening therethrough to releasably hold the closure against movement outwardly of the cover assembly to an open position.

An overlapping releasable relationship of this type is effective only to hold the closure against outward movement. It is possible for someone to engage the closure and move the closure inwardly of the cover assembly. This invention has as its primary purpose an effective blocking of any movement of the closure inwardly of the cover assembly while still maintaining the releasable interlocking connection between the closure and the cover assembly to permit deployment of the cushion whenever necessary.

The cover assembly of this invention includes an outer thin member of semirigid plastic material and an inner layer of foam plastic which provide flanges defining the side and upper edge portions of an elongated opening therethrough for cushion deployment. The closure includes an outer member and inner layer formed integral with those of the cover assembly along the lower edge portion of the opening to integrally hinge the closure to the cover assembly. The free side and upper edge portions of the closure are provided with inwardly offset flanges which underlie the respective flanges of the cover assembly to provide the overlapping releasable relationship holding the closure against movement outward of the cover assembly unless the cushion is deployed. In order to maintain the generally coplanar relationship of the closure to the assembly by blocking any movement of the closure inwardly of the opening, the inner layer of the closure, in one embodiment, is provided with integral ribs at the side flanges of the closure. These integral ribs back up or resiliently engage flanges of the housing for the restraint cushion to block any inward movement of the side edge portions of the closure. A like rib formed on the flange at the upper edge portion of the closure engages an additional flange of the cushion housing to block any movement of this edge portion of the closure inwardly of the cover assembly. Since the ribs are formed of foam plastic, they can encase any bolt or screw heads on the flanges of the housing to prevent any possibility of the cushion engaging such heads and being abraded when the cushion deploys. Additionally, the ribs permit the contour of the closure and cover assembly to be independent of the contour of the cushion housing while blocking any inward movement of the closure to maintain the closure coplanar of the cover assembly and operative to be opened when the cushion is deployed. In a second embodiment, the integral ribs on the side flanges of the closure seat against the respective flanges of the housing and a filler strip mounted to the upper flange of the housing seats the upper flange of the closure. Since the extent of the rib which can be formed integral with the inner layer of the closure is limited, when the space between an edge portion of the closure and the housing exceeds this limit, the aforedescribed filler strips or otherwise are necessary. In a third embodiment, one of the integral ribs on a side flange of the closure engages a flange of the cushion housing. A filler member on a side flange of the cushion housing engages the integral rib on the other side flange of the closure. A filler strip on the cover assembly follows the contour of the upper edge portion of the closure and engages the upper flange thereof.

The primary feature of this invention is to provide an improved cover assembly for vehicle body occupant restraint systems wherein a closure for the deployment opening of the cover assembly is releasably held against movement outwardly of the opening to an open position by coacting flanges of the closure and cover assembly and the closure is blocked against movement inwardly of the opening by coacting elements between the closure and/or the cover assembly and the housing for the occupant restraint cushion.

This and other features of the invention will be apparent from the following drawings wherein:

FIG. 3 is an enlarged sectional view taken generally along the plane indicated by line 3—3 of FIG. 1;

FIG. 4 is a partially broken away perspective view of a portion of FIG. 1;

FIG. 5 is a view similar to FIG. 2 showing a second embodiment;

Figure 1:
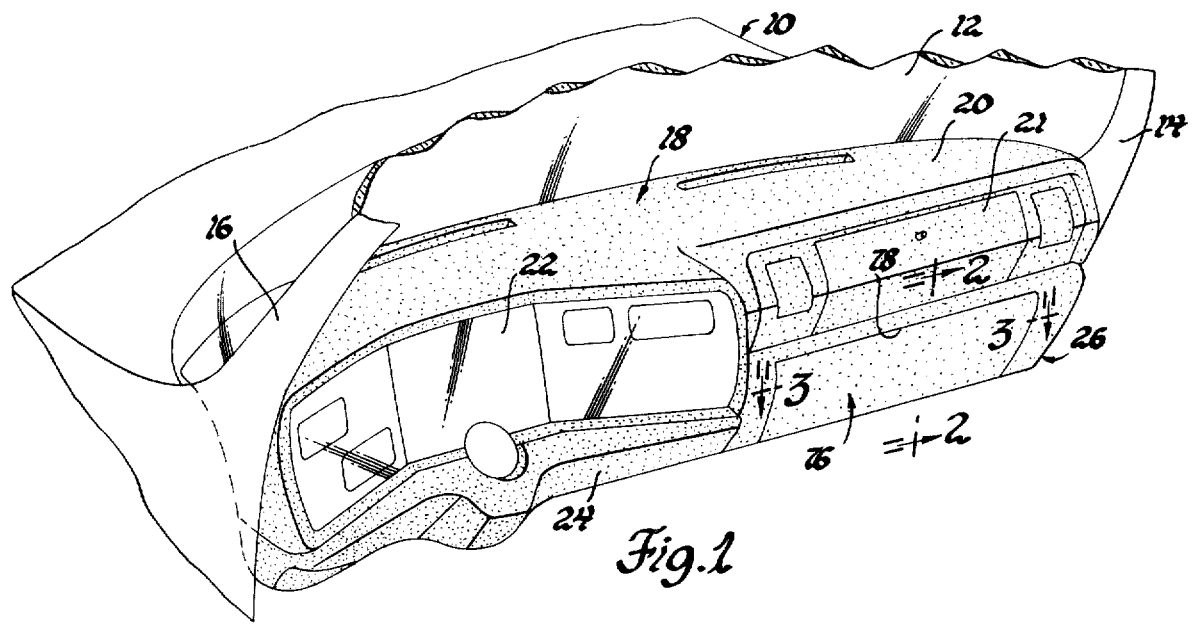
FIG. 1 is a perspective view of the instrument panel of a vehicle body embodying an occupant restraint system according to one embodiment of this invention.

Referring now particularly to FIG. 1 of the drawings, a vehicle body designated generally 10 includes a windshield 12 supported in a conventional manner on the cowl structure of the body and framed by right-hand and left-hand windshield pillars 14 and 16 which are formed as part of the respective hinge pillar structures of the body. The body further includes an instrument panel designated generally 18 and including an upper pad portion 20, a passenger console portion 21, a driver console portion 22, and a knee restraint 24. The knee restraint is similar to that shown and described in copending applications Arntson et al Ser. No. 276,084, filed July 28, 1972, and Arntson et al Ser. No. 406,262, filed Oct. 15, 1973.

A cover assembly 26 covers the passenger occupant restraint cushion system which is housed within the instrument panel 18 at the right-hand side thereof and generally below the console portion 21.

This system forms no part of this invention. Generally, as shown in FIG. 4, the system includes an inflator 28 which supplies pressure fluid through a manifold 30 to a diffuser 32. The diffuser 32 diffuses the pressure fluid to the occupant restraint cushion assembly, not shown, for deployment thereof. The diffuser and cushion assembly are housed within an open housing 34 which includes right-hand and left-hand end or side plates 36 and 38, respectively, and a generally U-shaped intermediate or reaction plate 40. The details of the diffuser, cushion, and housing 34 form no part of this invention, and reference may be had to Ser. No. 255,027 Matthews, filed May 19, 1972, and Ser. No. 305,444 Zens, filed Nov. 10, 1972, for such details. Generally, the side plate 36 is welded or otherwise secured to a flange 42 of plate 40 and includes a lateral flange 44. Likewise the plate 38 is secured to a similar flange, not shown, of plate 40 and includes a lateral flange 46. Plate 40 further includes a lateral flange 48 at its upper edge portion and a flange 50 at its lower edge portion.

As shown in FIG. 4, the instrument panel support structure includes a tie bar 52 having its outboard end welded or otherwise secured to a bracket 54. Bracket 54 in turn is secured to a bracket 56 which is secured to the right-hand hinge pillar of the body. The inboard end of the tie bar 52 is secured to a bracket 58 which extends forwardly of the instrument panel structure and is secured to the cowl structure of the body at approximately the midpoint thereof. A reinforcement bracket 60 may be used to additionally support the bracket 58. The tie bar is thus supported on the body in a rigid fixed manner between the right-hand hinge pillar and the forward body wall and extends generally transversely of the body at approximately the upper edge of the cover assembly 26 and the lower edge of console portion 21.

As shown in FIG. 4, the upper flange 48 of the housing 34 is secured to the tie bar 52 by a number of bolts 62. Additionally the end plate 38 has its flange 46 secured by like bolts 64 to an apertured flange of bracket 58. The inflator 28 is supported to the housing 34 by a bracket 66, which is welded to plate 40 and clamps to the inflator through a bolt connection 68. The inflator is additionally secured to the forward body wall by a bracket 70 which is bolted at 72 to the bracket 66 and extends forwardly to the forward body wall or to rigid bracket structure extending therefrom.

Figure 2:
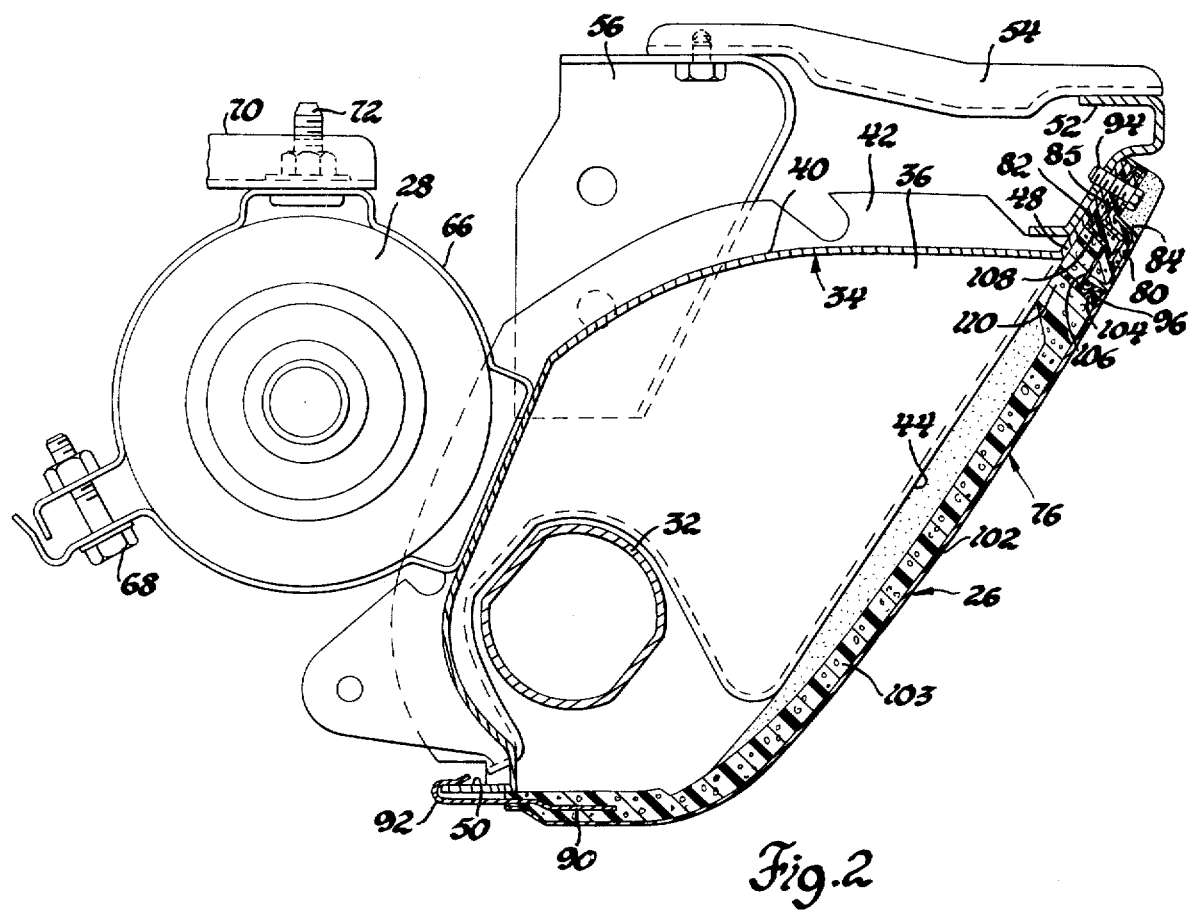
FIG. 2 is an enlarged sectional view taken generally along the plane indicated by line 2—2 of FIG. 1.

With reference now to FIGS. 2, 3, and 4, the cover assembly 26 includes a closure 76 which is integrally hinged at its lower edge to the cover assembly, as will be described, for downward swinging movement to an open position with respect to an opening 78 upon inflation of the cushion assembly to permit deployment of the cushion assembly therethrough. The opening 78 is generally coextensive of the opening of the housing 34 as defined by the flanges 44 and 46 of the side plates 36 and 38, respectively, and flange 48 of the reaction plate 40.

Generally the cover assembly includes an outer member or sheet 80 of thin semirigid plastic material. An inner layer 82 of cast foam, such as cast urethane, is secured to the outer member. The member 80 and layer 82 are offset flanged inwardly at 84 along the upper edge of the cover assembly. A reinforcement member 85, respective to the shape of the flange 84, is provided within the inner layer 82. This reinforcement member 85 extends only across the upper edge of opening 78 and may be integral with or secured to the upper ends of reinforcement members 86 and 88, FIG. 3, which extend along the side edges of opening 78 within the inner layer 82. The lower ends of these reinforcement members are secured to a lower reinforcement member 90 which extends across the lower edge of the cover assembly. Member 90 extends partially outside of the inner layer 82 and includes a hook portion 92 which hooks over flange 50 to releasably secure the lower edge of the cover assembly to the housing 34. The upper edge portion of the cover assembly is secured to the tie bar 52 by a number of bolts 94, FIG. 2, which extend through the flange 84 and the reinforcement member 85.

The member 80 includes laterally inwardly extending flanges 96, 98, and 100, FIGS. 2 and 3, which define respectively the upper, left-hand, and right-hand side edges of the opening 78.

The closure 76 includes an outer sheet or member 102 and an inner layer 103 which are formed integral with member 80 and layer 82 as shown in FIG. 2 along the lower edge portion of the opening and of the closure to integrally hinge the closure 76 to the cover assembly for downward swinging movement outwardly of the opening 78 when the cushion is deployed. The member 102 includes lateral flanges 104, 106, and 108, FIGS. 2 and 3, at its side and upper edges. Flanges 104 are juxtaposed to the flanges 96, 98, and 100. The flanges 106 underlie the inner layer 82 of the cover assembly while flanges 108 are juxtaposed to flanges of this inner layer.

The overlapping relationship of flanges 106 and the inner layer 82 releasably holds the closure 76 in closed position against movement outwardly of the opening 78. As shown in FIGS. 2 and 3, the flanges 96, 98, and 100 have their free edges slightly laterally offset and such offset free edges are received within shallow grooves formed in flanges 104 to additionally aid in releasably holding the closure 76 in closed position.

The closure 76 is moved to an open position by swinging downwardly about its lower edge portion when the cushion assembly housed within the housing 34 is inflated. As the cushion inflates, the pressure of the cushion against the closure 76 bulges the closure outwardly until the flanges 106 slip past the inner layer 82 of the cover assembly. This bulging or distortion of the closure is aided by the flexibility of the outer member 102 and of the inner layer 103 thereof. The reinforcement members 85, 86, and 88 reinforce the upper and side edges of the cover assembly around the opening 88 to aid in movement of the closure 76 to its open position. The reinforcement member 90 reinforces the integral hinge between the cover assembly and the closure 76 as well as providing for mounting of the lower edge of the cover assembly to the housing 34. The upper edge of the cover assembly is bolted to the flange 48 of the housing and the tie bar as previously mentioned. While only the upper and lower edges of the cover assembly have been described as being secured to fixed structure on the body, the right-hand and left-hand edges of the cover assembly may likewise be secured to the hinge pillar structure and to the knee restraint in conventional manners if so desired.

The cover assembly 26, in addition to its functions with respect to the restraint cushion, also functions to complete the instrument panel of the body. Thus it should blend in with and follow the contours of the instrument panel and particularly the console portion 21 thereof. While the overlapping flange arrangement between the closure and cover assembly releasably holds the closure in a closed position against outward movement, it is possible for someone to press against the closure and move the closure inwardly of the cover assembly unless the closure is backed up or supported against such movement. In order to accomplish this, the inner layer 103 along the flange 106 at the upper edge portion of the closure is thickened to provide a rib 110 as shown in FIG. 2 which presses against the flange 48 of the housing 34 to support the upper edge of the closure against inward movement. The thickness of the rib 110 will, of course, depend upon the spacing between flange 106 and flange 48. Preferably, this thickness is such as to require some compression of the rib 110 when the cover assembly is mounted on the housing 34. Likewise, the inner layer 103 along the flanges 106 at the side edge portions of the closure is thickened to provide ribs 112 and 114 which respectively seat against the flanges 46 and 44 of the housing 34 to back up or support the side edges of the closure against movement inwardly of the opening 78. Since the upper edge of the cover assembly is secured to the flange 48 and to the tie bar as shown in FIG. 2, this upper edge is thereby additionally reinforced against distortion which might contribute to movement of the closure 76 inwardly of the opening 78. As shown in FIG. 3, the inner lay 82 of the cover assembly backs up against the flanges 44 and 46 for additional reinforcement against distortion. Thus, the edge portions of both the cover assembly and of the closure 76 are resiliently supported against inward movement by engagement with flanges of the housing 34. In addition to blocking inward movement of the closure, this also aids in maintaining the generally coplanar relationship of the closure to the cover assembly to increase the aesthetic appearance of the interior of the body.

Figure 6:
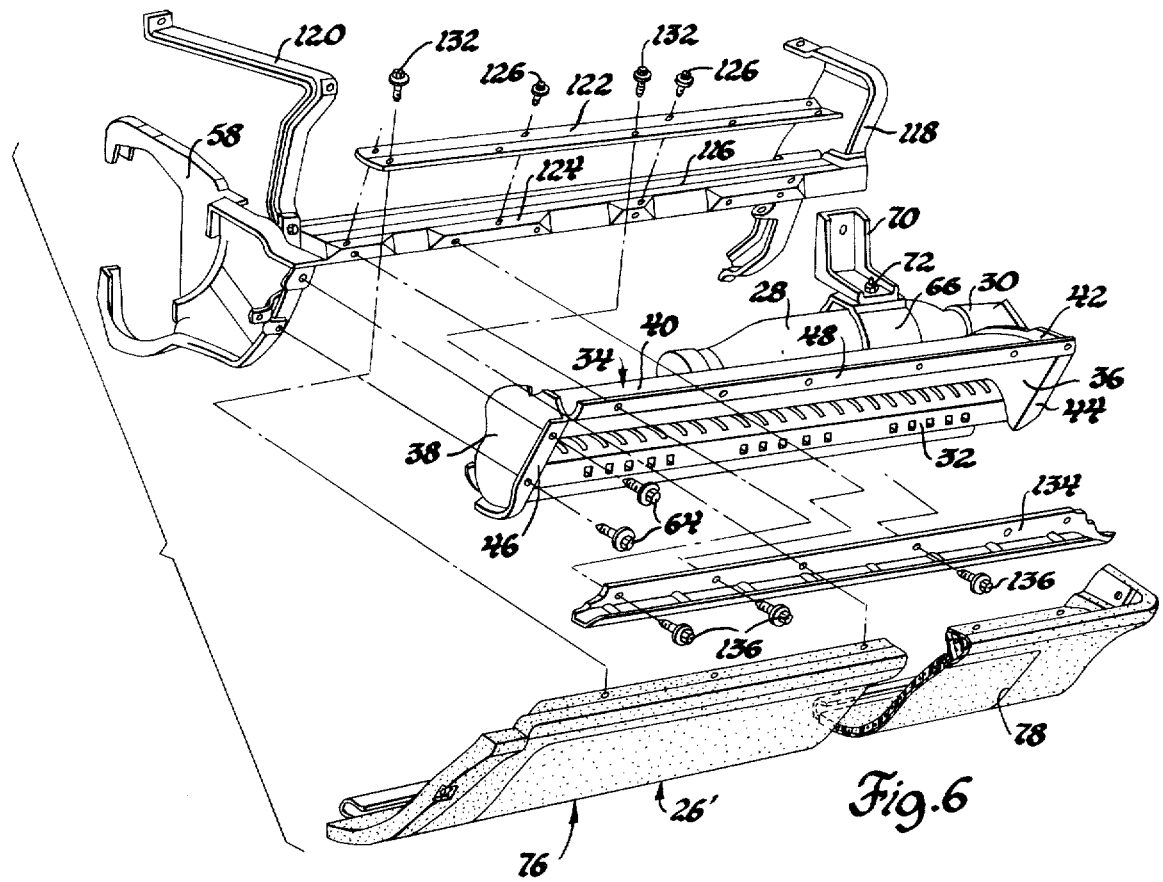
FIG. 6 is a view similar to FIG. 4 showing the second embodiment.

FIGS. 5 and 6 show a second embodiment of this invention, and like numerals have been used for like parts.

In this embodiment, the tie bar 116 is of different shape than the tie bar 52 and is supported on the body by an outboard bracket 118 which is conventionally secured to the right-hand hinge pillar, the inboard bracket 58, and an additional bracket 120 which interconnects the inboard end of the tie bar and the forward body wall. An elongated support bracket 122 seats on embossments 124 of the tie bar and is bolted thereto at 126.

The cover assembly 26' is basically the same as the cover assembly 26 except that the upper edge portion thereof is of different shape, compare FIGS. 2 and 5, and is spaced outwardly from the tie bar and flange 48 of the housing 34. The upper edge portion of the cover assembly 26' includes a generally U-shaped reinforcement member 128 which extends through the inner layer 82. Both the upper edge portion of the cover assembly 26' and a partially shown flange 130 of the console portion 21 are secured to bracket 122 by sheet metal screws 132 which extend through member 128.

In order to fill the space between the upper edge portion of the closure 76 and the flange 48, a generally U-shaped sheet metal filler member 134 has one leg thereof bolted at 136 to the flange 48 and to the tie bar 116. Bolts 136 also secure the housing 34 to the tie bar. The other leg of member 134 bears against the rib 110 along the upper edge of the closure 76. Since the thickness or extent of the ribs on the closure is limited due to manufacturing and other considerations, when the space between the closure and the flanges of the housing 34 exceeds the normal extent of the rib, then filler members such as the member 134 are required. The side edges of the closure 76 of assembly 26' back up against the flanges 46 and 44 of plates 36 and 38 in the same manner as the side edges of the closure 76 of cover assembly 26.

Figure 7:
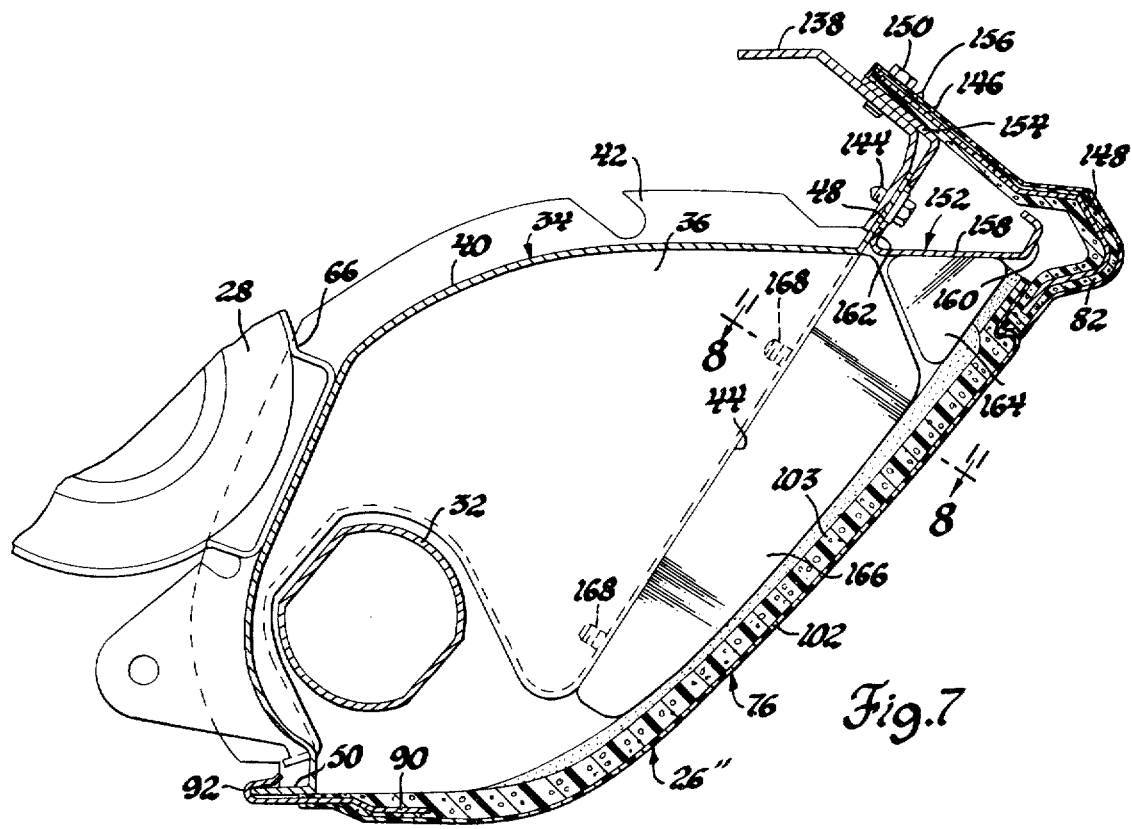
FIG. 7 is a view similar to FIG. 2 showing a third embodiment.
Figure 8:
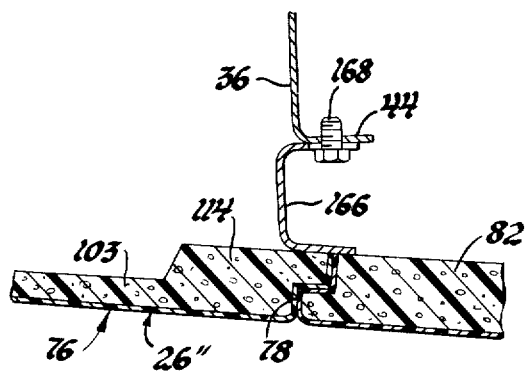
FIG. 8 is a sectional view taken generally along the plane indicated by line 8—8 of FIG. 7.
Figure 9:
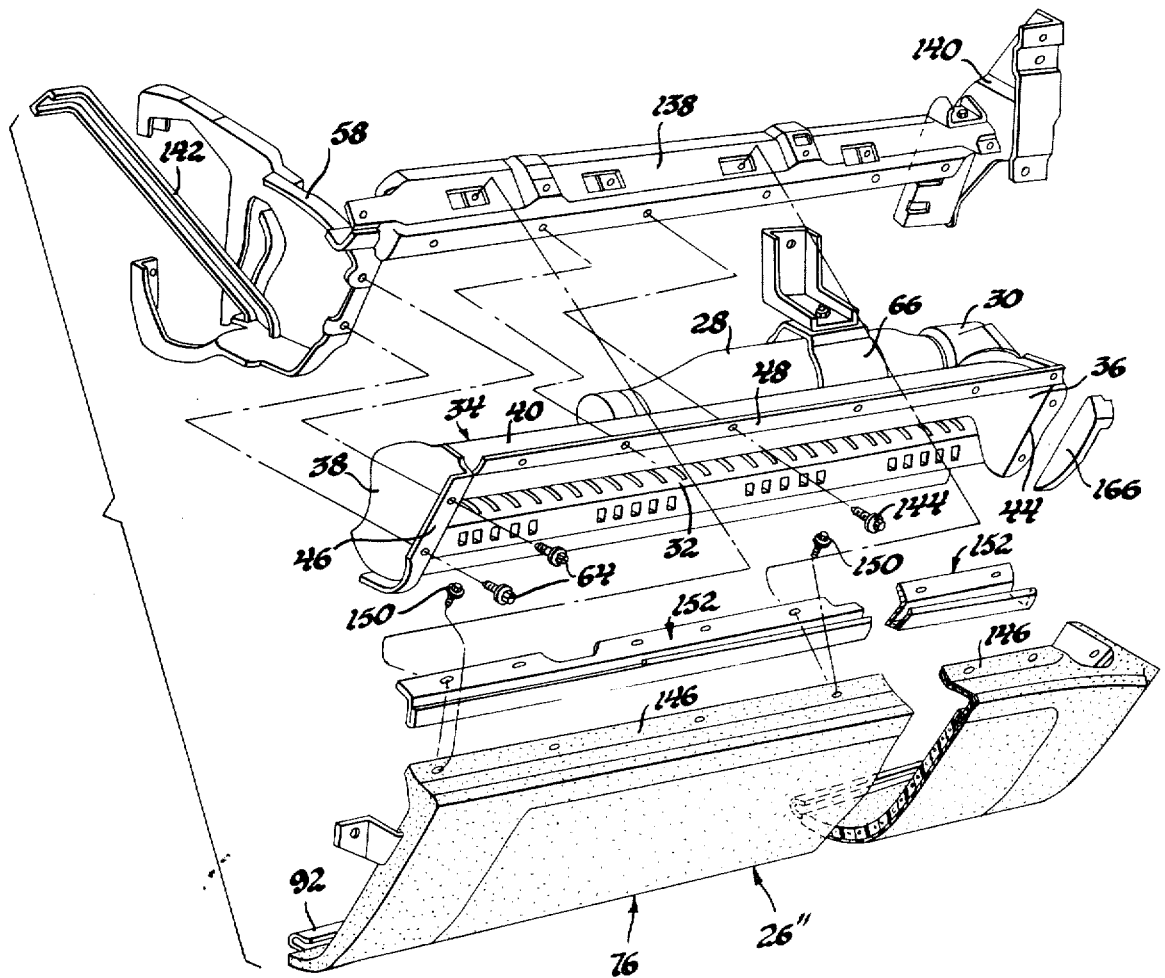
FIG. 9 is a view similar to FIG. 4 showing the third embodiment.

FIGS. 7, 8, and 9 show a third embodiment of this invention and, again, like numerals will be used for like parts. In this embodiment, the tie bar 138 is of a shape different than either the tie bar 52 or 116. However, the tie bar 138 is supported on the body in the same general manner by means of an outboard bracket 140 secured to the right-hand hinge pillar and the inboard bracket 58. This latter bracket is additionally reinforced by a bracket 142 extending therebetween and the forward body wall. The housing 34 is secured to the tie bar 138 by a number of bolts 144.

The cover assembly 26" is of the same general structure as the cover assembly 26. However, the upper edge portion thereof is again of slightly different shape and includes a wide flange portion 146 having a reinforcement member 148 encased within the inner layer 82 thereof. The flange portion 146 seats against the tie bar 138 and is secured thereto by a number of bolts 150, FIGS. 7 and 9.

The rib 112 of the left-hand side edge portion of the closure 76 backs up against the flange 46 of plate 38 in the same manner as the ribs 112 of the closures 76 of cover assemblies 26 and 26'. However, the distance between the upper edge portion of the closure 76 and the flange 48 increases from the center of the body to the outboard right-hand side thereof since the cover assembly 26" and flange 48 diverge with respect to each other. In order to fill this space, a sheet metal filler member 152 has one leg 154 thereof stapled or otherwise rigidly secured at 156 to the flange portion 146 of the cover assembly. The base leg 158 of the filler member gradually increases in extent or diverges from inboard of the body to the outboard right-hand side thereof and slants upwardly of the body as leg 160 converges from inboard of the body to outboard thereof. The free forward leg 162 of the member 152 is provided with a number of openings as shown in FIG. 7 to receive the heads of the bolts 144. The leg 160 of the member 152 is resiliently engaged by the rib 110 along the upper edge portion of the closure 76 in order to back up this upper edge portion against movement inwardly of the opening 78. The member 152, as well as member 134, both extend entirely across the opening 78 in order to ensure that possibly sharp ends of these members cannot engage and possibly abrade the cushion as the cushion deploys.

Along the right-hand side edge portion of the closure 76, a generally triangularly shaped, flanged filler member 164 is secured to the leg 158 of member 152 in order to back up the upper part of rib 114 of the closure. Additionally, an elongated filler member 166, bolted at 168 to flange 44, backs up the remainder of the rib 114.

From the foregoing description, it can be seen that the cover assembly of this invention includes a closure which is releasably held against movement outwardly of an opening in the cover assembly until such time as the cushion is deployed. Additionally, any movement of the cover assembly inwardly of the opening is effectively blocked by backing up or supporting the underlying flange of the closure to either the housing for the restraint cushion or to the cover assembly or to both.

In the embodiments 26' and 26'' of the cover assembly, the various filler members perform the backup or supporting function. Additionally, it will be noted that they block any movement or "squirting" of the cushion into the space between the cover assembly and the housing 34 after the closure has opened and the cushion is being deployed. This prevents any possible abrasion of the cushion. The resilient engagement of the inner layer 82 of the various embodiments of the cover assembly with the flanges 46 and 44 or member 166 likewise functions to accomplish this same purpose as the cushion deploys.

Thus, this invention provides an improved cover assembly for a vehicle body occupant restraint system.

We claim:

1. The combination comprising, a vehicle body having an instrument panel structure, an occupant restraint cushion housing having an elongated opening, an inflatable occupant restraint cushion mounted within the housing for deployment therefrom through the opening when the cushion is inflated, a cover assembly mounted on the instrument panel structure in covering relationship to the housing, said cover assembly including flange means defining the side and upper edges of an elongated opening generally coextensive of the housing opening and a closure hinged to the lower edge of the opening for movement between open and closed positions with respect to the opening thereof, said closure including an outer flexible member and an inner layer of foam plastic material formed into flanges at the side and upper edges thereof which underlie respective flange means of the cover assembly to releasably hold the closure against movement to an open position outwardly of the cover assembly opening and being ineffective to hold the closure against movement inwardly of the cover assembly opening, and rib means formed integral with the inner layer of the closure at the edges thereof and engageable with the restraint cushion housing to block movement of the closure inwardly of the cover assembly opening.

2. The combination comprising, a vehicle body having an instrument panel structure, an occupant restraint cushion housing having an opening, an inflatable occupant restraint cushion mounted within the housing for deployment therefrom through the opening when the cushion is inflated, a cover assembly mounted on the instrument panel structure in covering relationship to the housing, said cover assembly including an elongated opening generally coextensive of the housing opening and a closure hinged to one edge portion of the opening for movement between open and closed positions with respect to the opening, the cover assembly including an outer thin member provided with free edge portions defining the free edge portions of the opening and an inner layer of resilient material secured thereto, the closure including an outer member formed integral with the outer member of the cover assembly and forming a continuation thereof, the outer member of the closure including inwardly offset flanges underlying the inner layer of the cover assembly to releasably hold the closure generally coplanar of the cover assembly and against movement to an open position outwardly of the opening thereof, the flanges being ineffective to hold the closure against movement inwardly of the cover assembly opening relative to the restraint cushion housing, the closure including an inner layer of resilient material overlying the flanges thereof and being provided with integral rib means on the flanges thereof at the side edge portions of the closure for engagement with the restraint cushion housing to block movement of the side edge portions of the closure inwardly of the cover assembly opening, and additional means for blocking movement of the upper edge portion of the closure inwardly of the opening of the cover assembly.

3. The combination comprising, a vehicle body having instrument panel structure, an occupant restraint cushion housing having an opening, an inflatable occupant restraint cushion mounted within the housing for deployment therefrom through the opening when the cushion is inflated, a cover assembly mounted on the instrument panel structure in covering relationship to the housing said cover assembly including flanges defining the free edge portions of an elongated opening generally coextensive of the housing opening and a closure hinged to one edge portion of the opening for movement between open and closed positions with respect to the opening, the closure including an outer member having inwardly offset flanges respective to and underlying the flanges of the cover assembly to releasably hold the closure generally coplanar of the cover assembly and against movement to an open position outwardly of the opening thereof, the closure flanges being ineffective to hold the closure against movement inwardly of the cover assembly opening relative to the restraint cushion housing, an inner layer of resilient material overlying the closure flanges and being provided with integral ribs, certain of the ribs engaging the restraint cushion housing to block movement of the respective flanges of the closure inwardly of the cover assembly opening, and filler means of rigid material located between the restraint cushion housing and the outer of the closure ribs and engageable by the latter for blocking movement of the respective flanges of the closure inwardly of the opening of the cover assembly.

4. The combination comprising, a vehicle body having an instrument panel structure, an occupant restraint cushion housing having an opening, an inflatable occupant restraint cushion mounted within the housing for deployment therefrom through the opening when the cushion is inflated, a cover assembly mounted on the instrument panel structure in covering relationship to the housing, said cover assembly including flanges defining the free side and upper edge portions of an elongated opening generally coextensive of the housing opening and a closure hinged to the lower edge portion of the opening for movement between open and closed positions with respect to the opening, the closure including an outer member having inwardly offset flanges respective to and underlying the flanges of the cover assembly to releasably hold the closure generally coplanar of the cover assembly and against movement to an open position outwardly of the opening thereof, the closure flanges being ineffective to hold the closure against movement inwardly of the cover assembly opening relative to the restraint cushion housing, the closure including an inner layer of resilient material overlying the flanges thereof and being provided with integral ribs, the ribs on the flanges at the side edge portions of the closure engaging the restraint cushion housing to block movement of the side edge portions of the closure inwardly of the cover assembly opening, the rib on the flange at the upper edge portion of the closure engaging a rigid filler member secured to the housing to block movement of the upper edge portion of the closure inwardly of the opening of the cover assembly.

* * * * *